United States Patent [19]

Thompson

[11] 4,273,246
[45] Jun. 16, 1981

[54] BOTTLES WITH ATTACHED HANDLES AND A METHOD OF FORMING THE SAME

[76] Inventor: Mortimer S. Thompson, P.O. Box 113, Enfield, Conn. 06082

[21] Appl. No.: 40,865

[22] Filed: May 21, 1979

Related U.S. Application Data

[63] Continuation-in-part of Ser. No. 28,886, Apr. 10, 1979, which is a continuation of Ser. No. 877,603, Feb. 14, 1978, abandoned.

[51] Int. Cl.³ .............................................. B65D 23/10
[52] U.S. Cl. .................................. 215/100 A; 29/450; 29/453
[58] Field of Search .......................... 215/100 A, 101; 220/94 R; 29/450, 453

[56] References Cited

U.S. PATENT DOCUMENTS

| | | | |
|---|---|---|---|
| D. 194,285 | 12/1962 | Miller .................... | 215/100 A UX |
| 601,988 | 4/1898 | Smalley .................... | 215/100 A |
| 2,008,316 | 7/1935 | Stearns .................... | 215/100 A |
| 2,571,389 | 10/1951 | Snyder .................... | 220/94 R X |
| 2,930,502 | 3/1960 | Klein .................... | 215/100 A |
| 3,366,262 | 1/1968 | Seggerman .................... | 215/100 A |
| 3,456,864 | 7/1969 | Trombley .................... | 220/94 R X |
| 3,807,594 | 4/1974 | Zimmermann .................... | 215/100 A |

Primary Examiner—Donald F. Norton
Attorney, Agent, or Firm—Morgan, Finnegan, Pine, Foley & Lee

[57] ABSTRACT

A plastic bottle with an attachable handle for lifting, carrying and pouring. The handle generally is L-shaped. One leg of the handle coacts with and is affixed to the neck of the bottle and the other leg coacts with the sidewall of the bottle. When the handle is attached, the one leg generally is horizontal and can be snapped on or otherwise affixed to the neck of the bottle, and the other leg generally is vertical and can be in engagement with or attached to the sidewall of the bottle by interlocking, welding, bonding, adhesive, banding or other means. Also, when attached the handle is positioned substantially within the breadth of the bottle.

In forming the bottle and handle of the present invention, means can be provided for properly aligning the handle and bottle to facilitate coaction and attachment therebetween.

In a preferred embodiment the present invention provides a large biaxially oriented pressurized bottle with a lifting, carrying and pouring attachable handle without impairing the desired shape and properties of the bottle.

32 Claims, 46 Drawing Figures

FIG. 21B
FIG. 21A
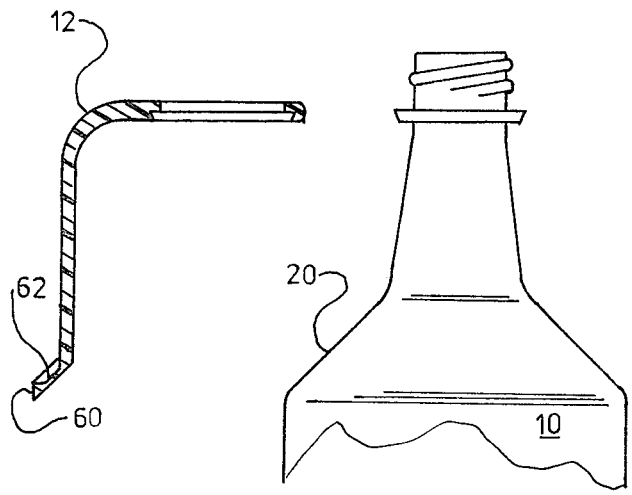
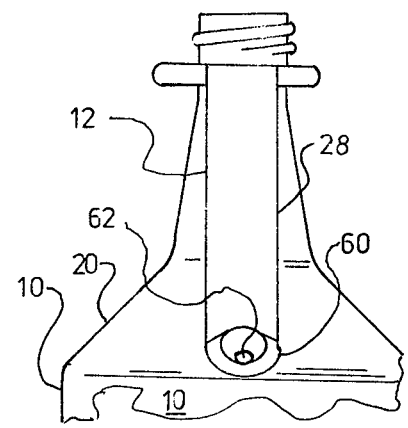
FIG. 22A
FIG. 21C
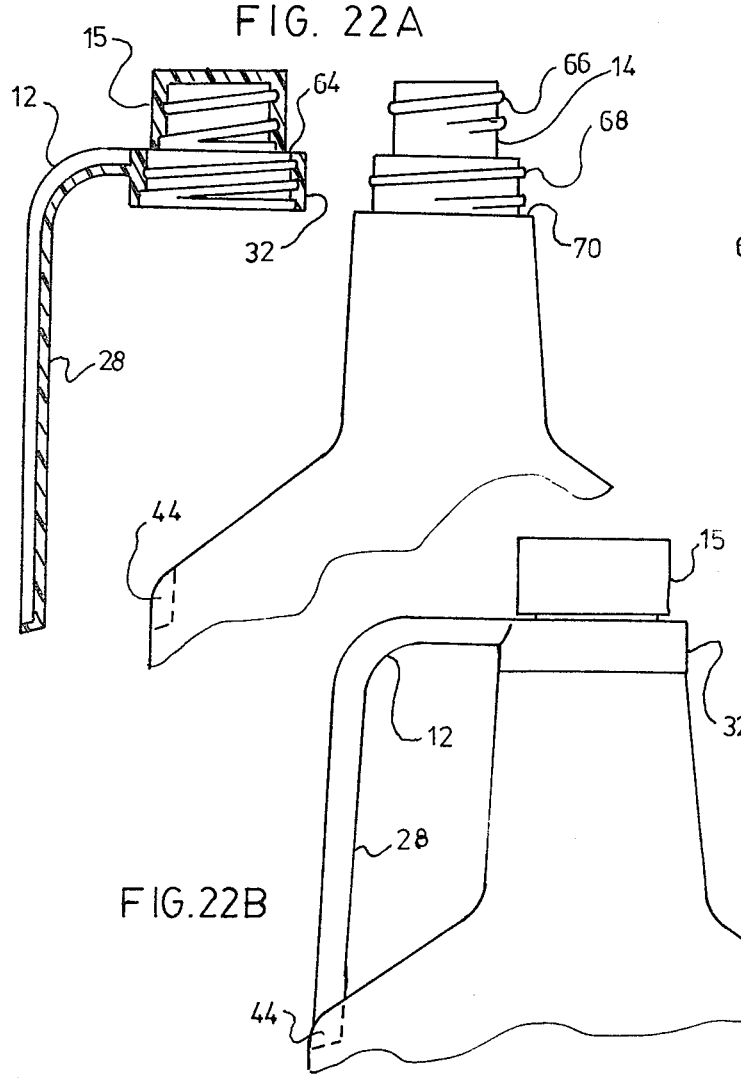
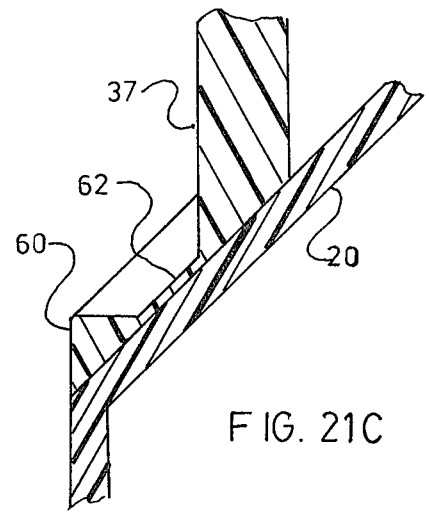
FIG. 22B
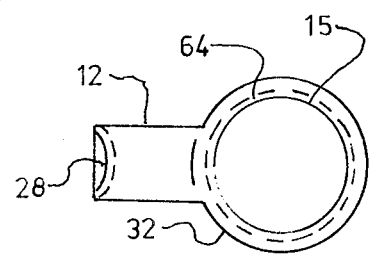
FIG. 22C

BOTTLES WITH ATTACHED HANDLES AND A METHOD OF FORMING THE SAME

This application is a continuation-in-part application of my application, Ser. No. 028,886, filed Apr. 10, 1979, which is a continuation application of my application, Ser. No. 877,603, filed Feb. 14, 1978, now abandoned.

FIELD OF THE INVENTION

This invention relates to bottles having attached handles and to a method of forming and assembling such bottles and handles, and particularly to biaxially oriented plastic bottles having attached carrying, lifting and pouring handles.

BACKGROUND OF THE INVENTION

Presently, large plastic bottles (e.g., 32 ounce, 64 ounce, 128 ounce, etc.) with handles for lifting, carrying and pouring generally are made by the extrusion blow molding process.

Initially an extruder forms large diameter preforms, hollow tubes known as parisons, and the parisons are positioned within blow molds having the desired final shape of the bottles. In each blow mold a portion of the parison is pinched off to form a handle shape and the pinched parison is blown to its final bottle dimensions with a hollow handle and an interconnecting web. Thereafter, the web is removed to provide a handle for gripping, lifting, carrying, and pouring.

In forming such hollow handles relatively high plastic temperatures and substantial parison thicknesses are required to provide satisfactory fusion in the pinched and blown parison. Also, the parison must have a large enough diameter so that it will essentially traverse the breadth of the bottle when pinched and blown.

The procedures for forming these bottles are well known. See *Modern Plastics Encyclopedia*, Vol. 54, No. 10A, 1977-1978, McGraw-Hill Publishing Co. (e.g., section on "Blow Molding" at page 230, et seq.; also see section on "Injection Blow Molding" at page 232 et seq.).

Depending on the design, the pinched, blown hollow handle can provide ease in carrying, lifting and pouring, or simply ease in carrying and lifting. In the instance of a pouring handle, moreover, the need to grip the side walls of the container is eliminated. This can result in lighter weight bottles at lower costs. These and other features make the pouring handle very popular for large plastic bottles made from a wide variety of thermoplastic materials including polyolefins (polyethylene and polypropylene) and polyvinyl chloride.

However, these methods and the resulting bottles with hollow handles do have drawbacks. For example, decreasing the amount of plastic, used to form the bottles, known as "light weighting", is limited in many cases by the need for adequate parison thickness to provide the requisite fusion along the extensive pinched off areas.

Another limitation is that the required large diameter parison produces bottles having wide variations in wall thicknesses, especially at and near the sidewall at the bottom juncture and at the shoulder area—the most vulnerable areas to drop impact and denting forces. This results because the pinch off distributes the parison into thick areas at each end of the pinch off and in very thin areas in the blown bottle at right angles to it.

Further, hollow handles generally are precluded from use in refillable containers, such as may be found in dairy uses. Cleaning and rinsing the interior of such handles is virtually impossible.

Still another limitation is that the relatively high fusion temperatures required to form the pinched off hollow handles cannot be used to form handles in the newer stretch blow molding process for forming plastic bottles. This process differs from the hollow handle blow molding process in that the parison is first stretched and then blown while at temperatures which are much lower than the fusion temperatures, typically within the 100° F. range above $T_g$ (the temperature at which the plastic material passes from the glass phase to the rubber phase). This procedure, which is known as stretch blow molding, or orientation blow molding, is not only replacing earlier blow molding techniques, but is opening up new markets. Advantages of the new procedures are related to the biaxial orientation of the polymeric material. While the parison is at a temperature insufficient to permit free plastic flow it is expanded biaxially to conform with the blow mold. The temperature of operation typically within the 100° F. range immediately above $T_g$ is such that expansion introduces true strain into the material, and this strain is translated into a definable polymer orientation which results in a number of attributes.

Alignment of polymer molecules results in increased tensile strength, as well as increased clarity, increased impact strength, and reduced creep. A vast market for carbonated soft drink containers is a direct result of significantly improved gas barrier properties.

Suitable container materials for stretch-blow molding are substituted and unsubstituted thermoplastic hydrocarbons. Commonly used materials at this time include acrylonitrile, polyvinyl chloride, polyethylene terepthalate, and polypropylene. This newer procedure also is known. See *Modern Plastics Encyclopedia*, Vol. 54, No. 10A, 1977-1978, McGraw-Hill Publishing Co. (e.g., section on "Stretch-Blow Molding" at page 233 et seq.).

The problem with producing plastic containers with handles using the stretch blow processes results from the nature of the process and condition of the plastic at the time it is biaxially oriented. It is not possible to produce handles by the aforementioned parison pinch-off technique because the plastic temperature required for suitable molecular orientation is much too low to permit adequate fusion of the plastic. To initially form the handle at elevated temperatures and then to cool to biorientation temperatures before stretching and blowing would yield handles, and substantial other unoriented portions of the container, with inferior containment and other properties.

SUMMARY OF THE INVENTION

In accordance with the present invention, there is provided a new and unique attachable handle for bottles and preferably plastic bottles formed by the previously described processes. The handle of the invention is generally L-shaped and is positioned to lie substantially within the breadth of the bottle. One leg of the handle coacts with and is affixed to the neck of the bottle and the other leg coacts with the middle or upper portion of the bottle. When attached, the one leg is generally horizontal and can be snapped or or otherwise affixed to the neck of the bottle. At the same time, the other leg is generally vertical. In one embodiment the generally vertical leg is attached to the side wall of the bottle by interlocking, bonding, welding, adhesive or other means. In another embodiment the handle is under tension so that the generally vertical leg is maintained in engagement with the sidewall of the bottle during gripping, lifting, carrying and pouring.

In a preferred embodiment the handle can include means which allow flexing for attachment to the bottle and to accommodate dimensional changes when the portion of the bottle adjacent the handle is under internal pressure. Illustratively the flexing means can include slots or grooves extending across the generally horizontal leg of the handle.

Further, the bottle and handle can be formed with means, such as an engaging notch and tooth, for properly aligning the handle on the bottle. For assembly the bottle and the generally horizontal leg of the handle are brought together and rotated relative to one another until the means engage. The aligned handle and bottle then can be attached by any one of the several means of the invention.

In all embodiments of the invention the attached handle facilitates lifting and carrying of, and pouring from, the bottle.

In addition, the attachable handles of present invention are made from materials which provide desired handle properties, such as stiffness and which minimize cost, including polystyrene, high density polyethylene, polypropylene, polyethyleneterepthalate and lower cost, reclaimed lots of such materials. They can be made from the same or dissimilar materials than the bottles to which they are attached.

The present invention, moreover, maximizes potential for light-weighting of plastic bottles because its attachable handle obviates the need for pinch-offs, large diameter parisons, and extra thicknesses for gripping.

Also, the handle of the invention does not require any significant additional space and can be filled, packaged and stored without requiring extra handling. By lying substantially within the breadth of the bottle the handle is a space saver and can be filled, packaged, displayed and stored without difficulty.

ILLUSTRATIVE EMBODIMENTS OF THE INVENTION

The following is a detailed description together with accompanying drawings of illustrative embodiments of the invention. It is to be understood that the invention is capable of modification and variation apparent to those skilled in the art within the spirit and scope of the invention.

In the drawings:

FIG. 21A is an end elevational view of another embodiment of the bottle and attached handle of the present invention wherein the handle is bonded to the bottle;

FIG. 21B is a side elevational view, partly in section, of FIG. 21A;

FIG. 21C is an enlarged detailed view of the welded or bonded arrangement between the generally vertical leg of the handle and the bottle;

FIG. 22A is a side elevational view, partly in section, of a further embodiment of the invention prior to attachment of a handle with a breakaway closure;

FIG. 22B is a side elevational view of the assembled bottle, closure and handle of FIG. 22A; and FIG. 22C is a plan view of the handle and breakaway closure of FIG. 22A.

Figure 1:
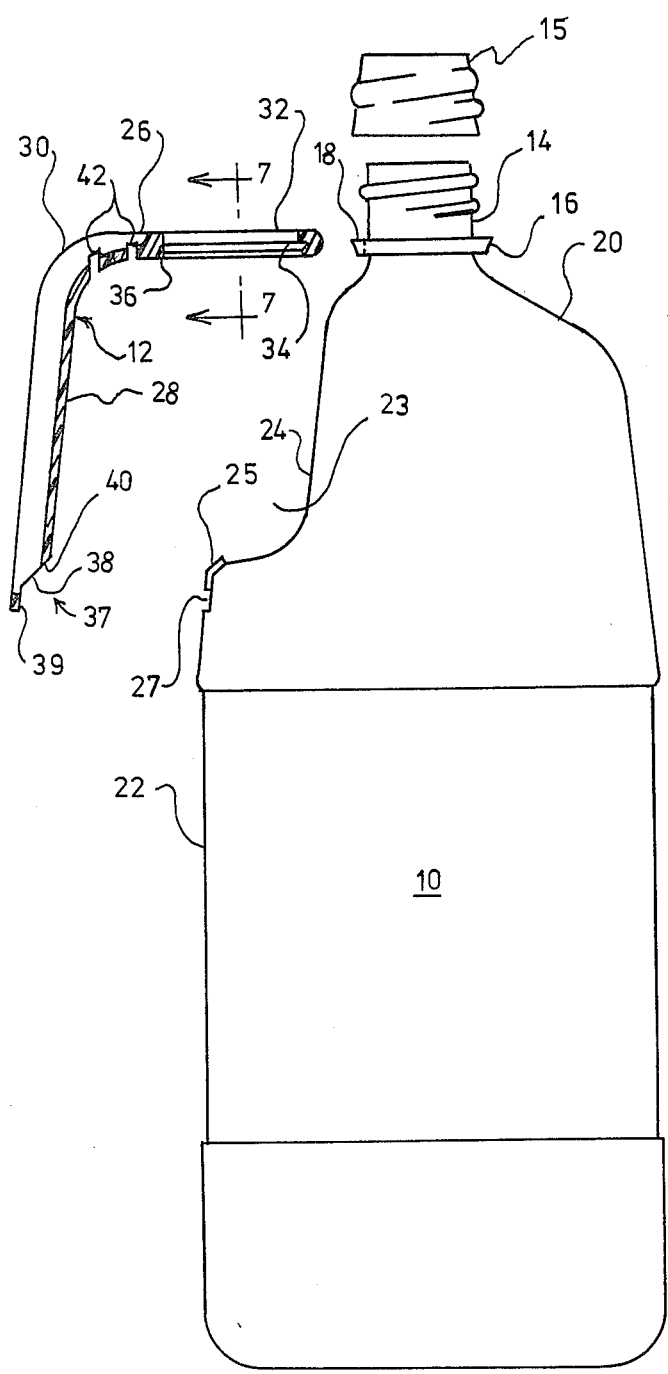
FIG. 1 is a side elevational view, partly in section, of a biaxially oriented pressurized bottle and an attachable handle of the invention.

Referring first to FIGS. 1-7 of the drawings, there is shown a plastic bottle 10 which includes the attachable handle 12 of the present invention.

The bottle 10 is formed from biaxially orientable thermoplastic materials and is made by the stretch-blowing process to provide a biaxially oriented, pressurized plastic container having a highly engineered and functional shape. This bottle 10 is well suited for containing carbonated beverages. As shown, the bottle 10 is generally of a circular cross sectional shape and has a relatively narrow threaded neck finish 14 adapted to receive cap 15. Immediately below the threaded neck 14 is a neck ring 16 which is beveled inwardly and which includes a notch 18 for positioning and locking the handle 12. Depending from the ring 16 is a shoulder 20 which connects the neck 14 to the body 22 of the bottle 10. In general, the bottle body 22 typically can be from 2 to 5 times larger in breadth than the relatively narrow neck 14.

On one side of the bottle 10 extending from the neck 14 to the body 22 is a recess 23 with a backwall 24 which, in cooperation with the handle 12, facilitates gripping, lifting, carrying and pouring.

Figure 6:
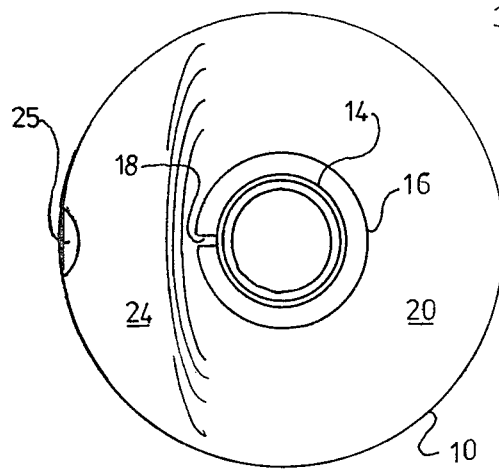
FIG. 6 is a plan view of the bottle shown in FIG. 1.
Figure 7:
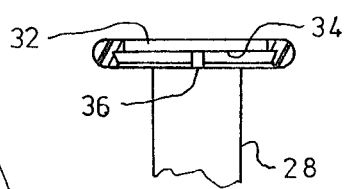
FIG. 7 is a sectional view of the horizontal leg of the handle, taken along the lines 7—7, of FIG. 1.

On the surface of the bottle 10 are locking means 25 which are in alignment with the notch 18 for positioning and locking the handle 12 to the bottle 10 (see FIG. 6). In this embodiment the locking means 25 is a lug formed as an integral part of the bottle 10 during the stretching-blowing process. In configuration the lug 25 is generally V-shaped having one leg on the bottle surface which defines the base of the recess 24 and the other leg on the bottle surface which defines the adjacent sidewall of the body 22. Immediately below the lug 25 is a slot 27 which, as hereinafter described, facilitates locking the handle 12 to the bottle 10.

The handle 12 generally is L-shaped and is attachable to the upper portion of the bottle 10 in the area defined by the recess 24 and, when attached, the handle 12 lies within the cross sectional dimension or breadth of the bottle 10. The handle 12 includes, when in position to be attached, a substantially horizontal leg 26 and a substantially vertical leg 28 joined by an integral curved segment 30.

The horizontal leg 26 is shorter than the vertical leg 28 and is generally rectangular in cross section at its free end. The leg 26 includes a bore 32 at its outer end which is larger in cross section than the neck 14 and ring 16. Within the bore 32 is an annular shoulder 34 which has a beveled curvature that complements the beveled curvature of ring 16 to provide an interlocking snap fit. To facilitate positioning and locking of the handle 12, a projection or tooth 36 depends from the shoulder 34 and extends outwardly from the handle wall forming the bore 32 (see FIG. 7). The configuration of the projection 36 is rectangular and is adapted to snugly fit within the notch 18.

The vertical leg 28 is semi-circular in cross section with the curvilinear portion facing inwardly to the bottle 10 for ease of gripping, lifting carrying and pouring. At its free or lower end 37, the leg 28 has an angular opening 38, and an outer projection 39 which extends below the inner projection 40. The shape and breadth of the opening 38 is such that the lug 25 is adapted to fit snugly therein with the upper or inner projection 40 abutting against the upper end of the lug 25 and with the lower or outer projection 39 abutting against the lower end of the lug 25 and snugly fitting within the slot 27 (see FIG. 3).

Figure 2:
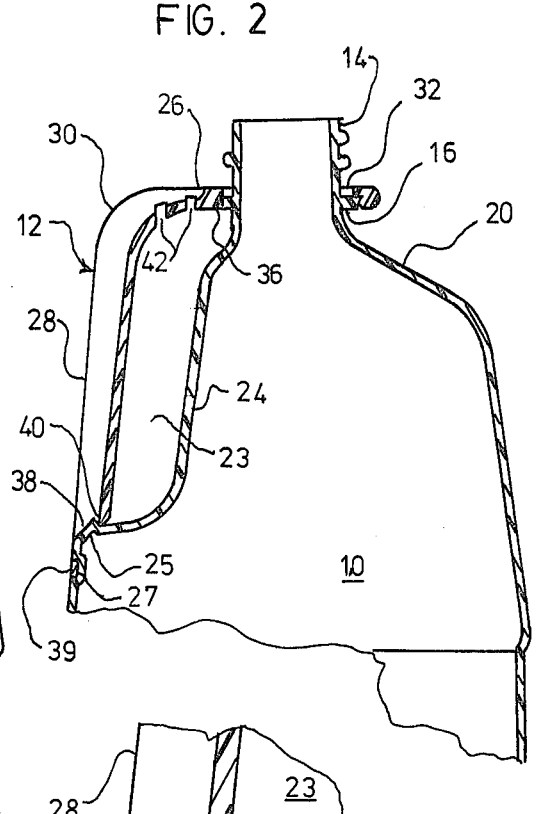
FIG. 2 is another side elevational view, in section, of the bottle and handle with the handle attached to the bottle.
Figure 3:
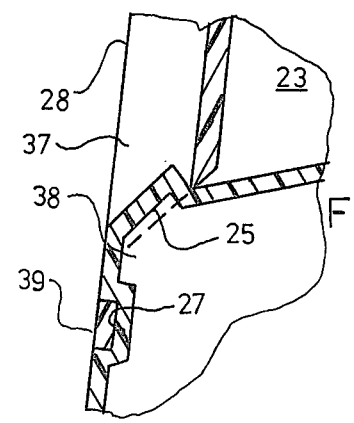
FIG. 3 is an enlarged detailed view showing the interlocking means between the vertical leg of the handle and the bottle.
Figure 4:
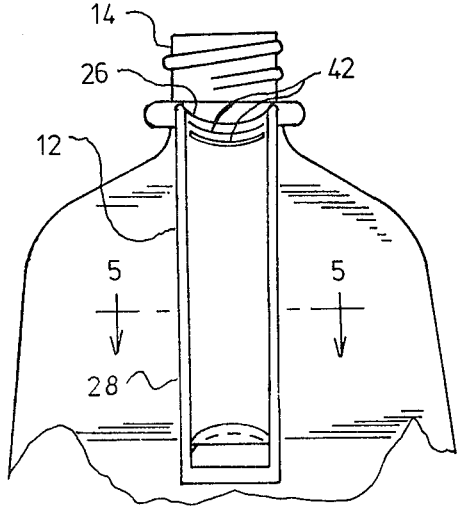
FIG. 4 is an end view of the bottle and attached handle of FIG. 2.
Figure 5:
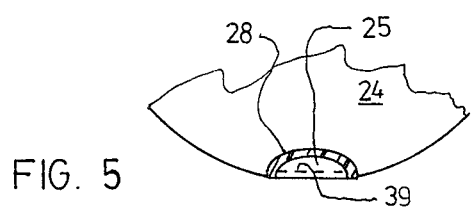
FIG. 5 is a sectional view of the vertical leg of the handle, taken along lines 5—5, of FIG. 4.

In this embodiment the handle 12 also includes flexing means which, as shown in FIGS. 1, 2 and 4, are a pair of spaced grooves 42 that extend across and partially through the horizontal leg 24. In use the grooves 42 permit flexing of the handle 12 to facilitate attachment to the bottle 10 and to allow for flexing of the handle 12 and upper portion of the bottle 10 when it is subjected to internal pressure.

In assembling the handle 12 to the bottle 10, the handle 12 is positioned so that the bore 32 of its horizontal leg 26 is positioned over the neck ring 16. The bottle 10 then can be rotated relative to the handle 12 until the tooth 36 slides into the notch 18 whereupon the annular shoulder 34 is snap fitted onto the neck ring 16 by reason of the complementary beveled surfaces.

At the same time the vertical handle leg 28 has been aligned with the lug 25, and the leg 28 is snapped onto the lug 25 with its projections 39 and 40 in engagement with the lug 25, and also with the projection 39 in the slot 27.

Thus, this embodiment provides a large biaxially oriented pressurized bottle 10 (32 ounce, 64 ounce, etc.) with an attachable handle 12 which permits lifting, carrying and pouring without impairing the desired properties or shape of the bottle 10.

In this and other embodiments of the invention, moreover, the handle 12 is a space saver and the bottle can be filled, packaged, displayed and stored without difficulty. By essentially being within the breadth of the bottle 10, added space is minimized and ease of filling, packaging, displaying and storing are maximized.

Referring to the other embodiments of the invention which now will be described, like reference numbers refer to like parts of the bottle and handle that have already been described.

Specifically, with respect to FIGS. 8A–8D, there is shown a bottle 10 of biaxially oriented thermoplastic materials having a shape particularly adapted to contain liquor (e.g., 64 ounce or 128 ounce).

In this embodiment the bottle 10 includes a plurality of depressions 43a, 43b, 43c and 44 in the neck finish 14 and in the sidewall of the bottle 10. Depressions 43a and 43b are positioned immediately above the neck ring 16 and oppose one another along the longitudinal axis of the bottle 10, and depression 43c is positioned centrally therebetween and at the same radial level. Depression 44 is spaced below and in alignment with the central depression 43c in the base of the shoulder 20 and adjoining body 22.

The handle 12 includes a horizontal leg 26 having, at its free end, resilient, semicircular opposing, yoke-shaped arms 45. At the ends and base of the yoke-shaped arms 45 are projections 46a, 46b and 46c. Opposing projections 46a and 46b face inwardly for locking engagement in the depressions 43a and 43b, and projection 46c extends into the space between the arms 45 for locking engagement in the depression 43c.

Figure 8A:
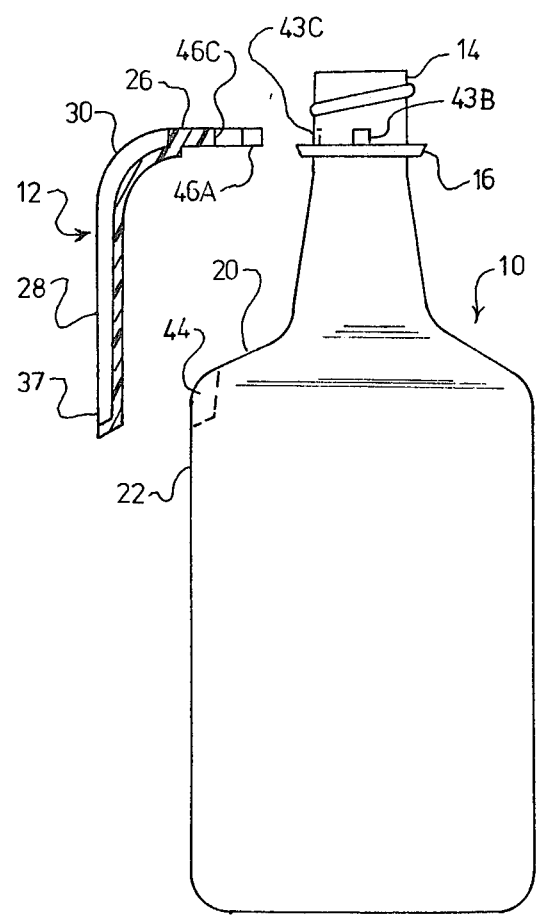
FIG. 8A is a side elevational view, partly in section, of an embodiment of a bottle and an attachable tension handle of the invention.
Figure 8B:
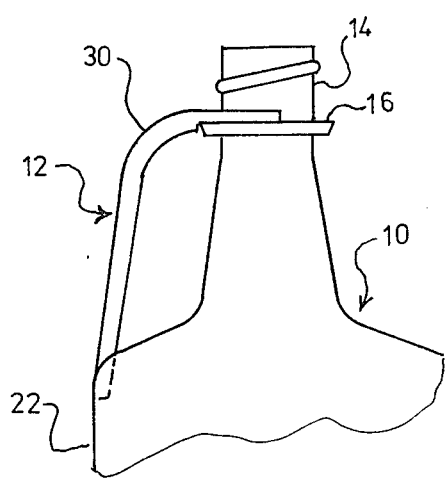
FIG. 8B is another side elevational view of the bottle and handle of FIG. 8A with the handle under tension and attached to the bottle.

As shown in FIG. 8A, the generally vertical leg 28 of the handle 12 normally is at about a 90° angle to the horizontal leg 26, and the end 37 of leg 28 and the depression 44 have complementary shapes for engagement therebetween. To achieve this engagement the leg 28 is adapted to be flexed outwardly as the leg 26 is attached to the neck 14. This places the handle 12 under the required tension along its full length and maintains engagement between the leg end 37 and the bottle 10 within the depression 44.

Figure 8C:
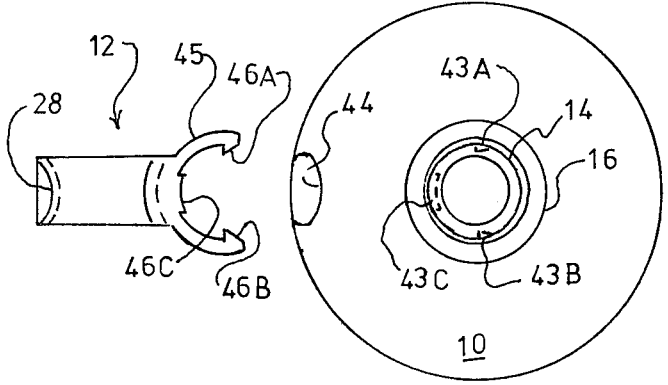
FIG. 8C is a plan view of FIG. 8A.
Figure 8D:
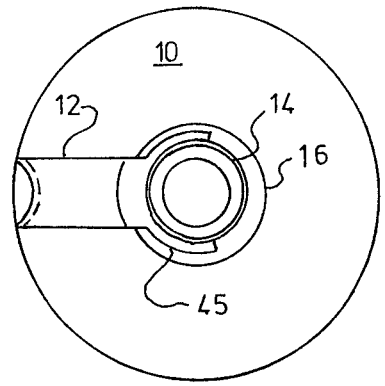
FIG. 8D is a plan view of FIG. 8B.

In assembling the handle 12, the resilient arms 45 are placed about the neck 14 and the bottle 10 and/or handle 12 is rotated. When the end 37 of the handle leg 28 is in alignment with the sidewall depression 44, the projections 46a, 46b and 46c are in alignment with the neck depressions 43a, 43b and 43c. The horizontal handle leg 26 is then pushed inwardly while pressure is applied to the joining curved segment 30 of the handle 12 to spread the handle legs 26 and 28 which forms an obtuse angle therebetween. This action locks the projections 46a, 46b and 46c of the horizontal handle leg 26 in the depressions 43a, 43b and 43c of the bottle neck 14 while developing sufficient tension in the full length of the handle 12 to retain the leg end 37 firmly in the sidewall depression 44. When desired the sidewalls of depression 44 may be undercut as shown in FIG. 8C to allow a gripping action on handle end 37 for additional security of its engagement with the sidewall. Alternatively alignment of handle end 37 with recess 44 may be accomplished by depending on the arrangement of projections 46a, 46b and 46c with the neck depression 43a, 43b and 43c. With the handle 12 so attached it can be gripped for lifting, carrying and pouring from the bottle 10.

With respect to the next four embodiments (FIGS. 9A-9C, 10A-10C, 11A-11C and 12A-12C) they illustrate additional interlocking means between the horizontal leg 26 and the neck 14 for the tension handle 12 of the invention.

Figure 9A:
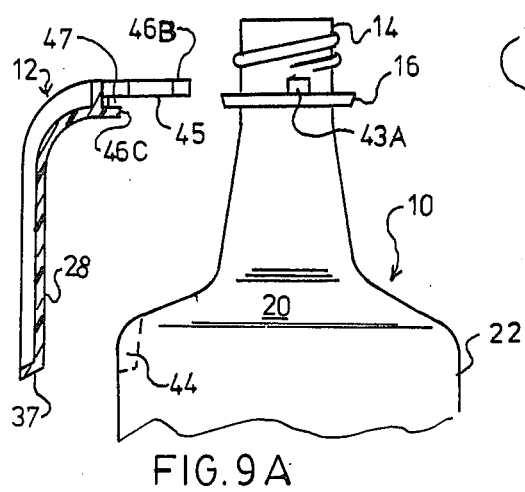
FIG. 9A is a side elevational view, partly in section, of another embodiment of a bottle and attachable tension handle of the invention.
Figure 9C:
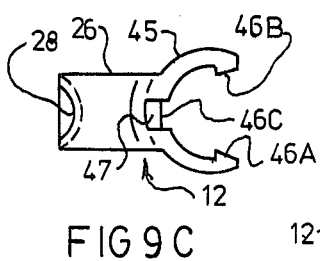
FIG. 9C is a plan view of the handle shown in FIG. 9A.
Figure 9B:
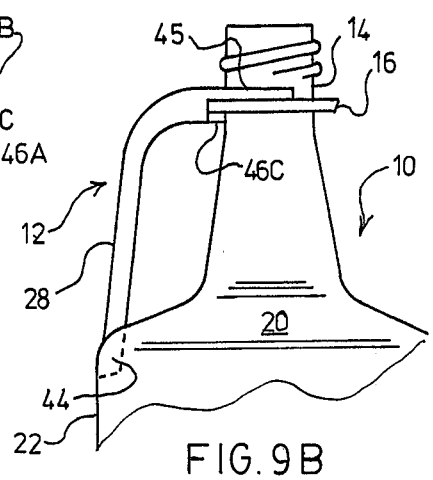
FIG. 9B is a side elevational view of the bottle and handle of FIG. 9A with the handle under tension and attached to the bottle.

In FIGS. 9A-9C the central projection 43c is spaced below the base of the arms 45 to define a slot 47 therebetween in which the neck ring 16 is slidably engaged. Here, in pushing the horizontal leg 26 inwardly, the neck ring 16 is slidably engaged by the projection 46c and the base of the arms 45 within the slot 47 while the opposing projections 46a and 46b snap into the opposing depressions 43a and 43b. In this embodiment alignment of handle end 37 with recess 44 may be accomplished by situating the engagement of projections 46a and 46b with neck depressions 43a and 43b so that they are other than in 180° opposition, as shown in FIGS. 9A and 9C.

Figure 10A:
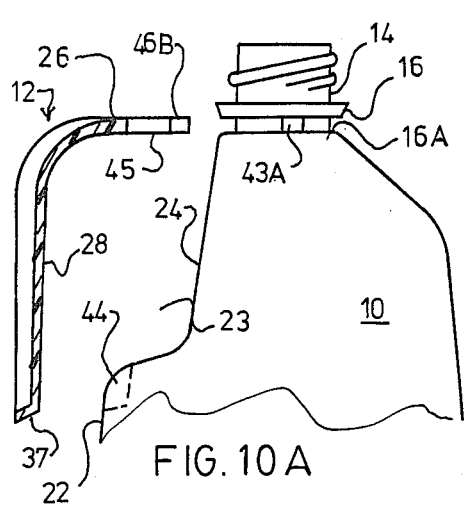
FIG. 10A is a side elevational view, partly in section, of a further embodiment of a bottle and attachable tension handle of the invention.
Figure 10C:
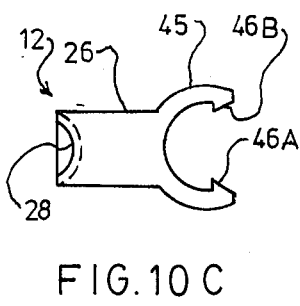
FIG. 10C is a plan view of the handle of FIG. 10A.
Figure 10B:
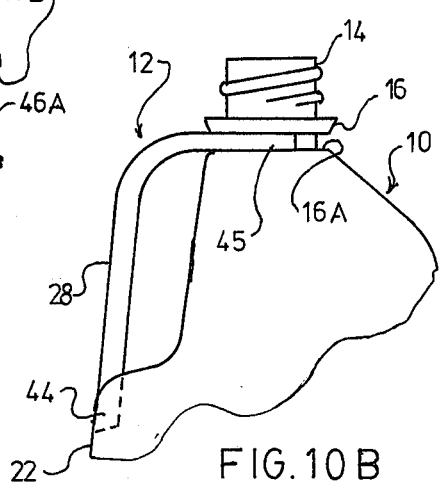
FIG. 10B is a side elevational view of the bottle and handle of FIG. 10A with the handle under tension and attached to the bottle.

In FIGS. 10A-10C the opposing depressions 43a and 43b are spaced immediately below the neck ring 16 for engagement by the projections 46a and 46b as previously described and the base of the neck ring 16 provides the central downward thrust which places the handle 12 in tension. Annular shoulder 16a is optional and provides additional security for the horizontal handle end 26 engagement with the bottle neck 14. The engagement of projections 46a and 46b are in other than 180° opposition to provide an aligning means between handle leg 28 with shoulder recess 23.

Figure 11A:
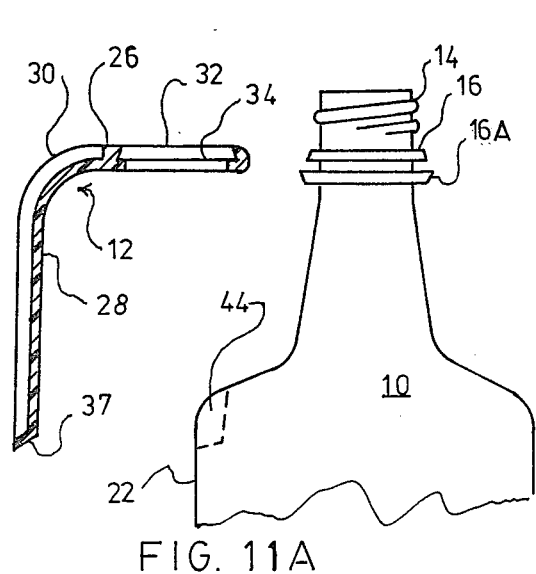
FIG. 11A is a side elevational view, partly in section, of still another embodiment of a bottle and attachable tension handle of the invention.
Figure 11C:
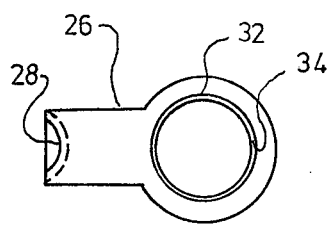
FIG. 11C is a plan view of the handle of FIG. 11A.
Figure 11B:
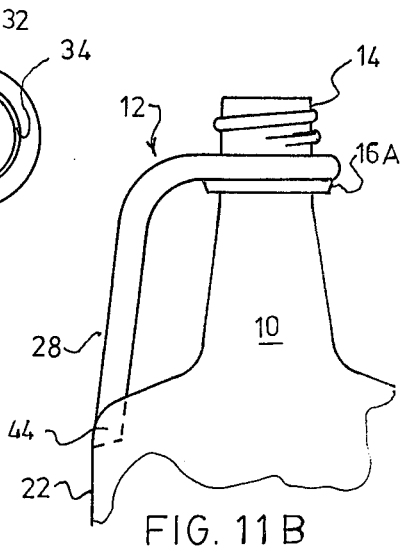
FIG. 11B is a side elevational view of the bottle and handle of FIG. 11A with the handle under tension and attached to the bottle.

FIGS. 11A-11C illustrate a snap fit locking means for the horizontal leg 26 of the handle 12. In this instance the bore 32 is placed around the neck finish 14 and in contact with the neck ring 16. The bottle 10 and/or handle 12 is then rotated to align handle end 37 with sidewall depression 44, whereupon the annular shoulder 34 is snap fitted onto the neck ring 16 by reason of the complementary beveled surfaces using ring 16a optionally to prevent further downward movement of bore 32 so that engagement with ring 16 is securely maintained. To firmly hold the bore 32 against the stresses imposed by the tension developed in handle 12 upon attachment, the direction of the beveling is inverse to that previously described (FIGS. 1-7). Accordingly, when the shoulder 34 is snapped below the neck ring 16 it engages the underside thereof. When assembled the tension imparted to the handle 12 constantly urges the shoulder 34 into locking engagement with the rings 16 and 16a. Optionally ring 16a may be replaced by the bottle shoulder designed and spaced to provide a similar restraint to bore 32.

Figure 12A:
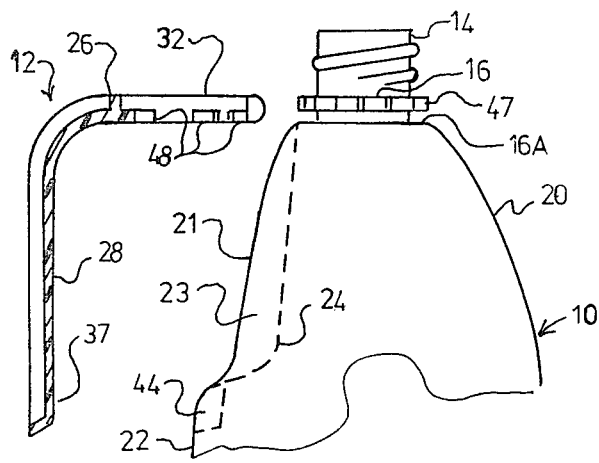
FIG. 12A is a side elevational view, partly in section, of another embodiment of a bottle and attachable tension handle of the invention.
Figure 12B:
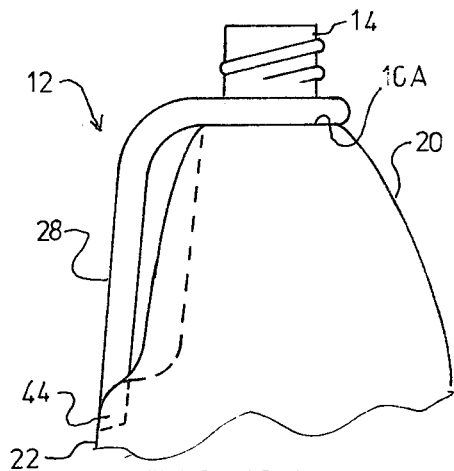
FIG. 12B is a side elevational view of the bottle and handle of FIG. 12A with the handle under tension and attached to the bottle.
Figure 12C:
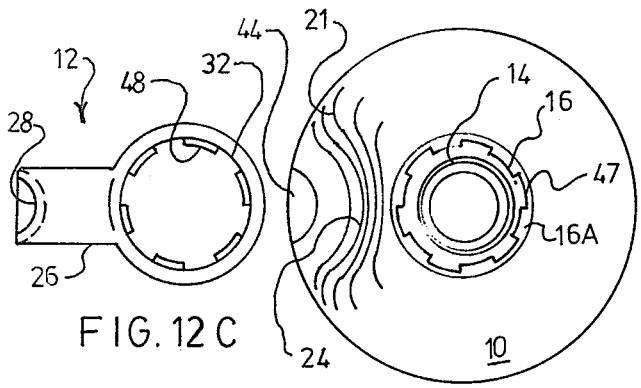
FIG. 12C is a plan view of the bottle and handle of FIG. 12A.

FIGS. 12A-12C illustrates a twist locking engagement for the horizontal leg 26 and the neck 14. About the neck ring 16 and about the annular wall of the bore 32 of the leg 26 are cooperating interlocking lugs 47 and 48. When the bore 32 is placed about the neck 14, the handle 12 and/or bottle 10 can be rotated and the lugs 48 pass between and under lugs 47 with a downward thrust on the free end of the leg 26 resting on the top 16a of the shoulder 20. Rotation may be continued until handle end 37 engages sidewall recess 44 preventing further rotation, thereby locking handle 12 in place. In another embodiment top 16a may be replaced by a second, but continuous neck ring (such as shown in FIG. 11A).

Further one of the lugs 48 of bore 32 and one of the spaces between lugs 47 of the neck ring 16 may be of a greater radial dimension than the others so that the desired engagement occurs only when vertical handle leg 28 is in alignment with recess 23. Thereafter the handle 12 can be rotated until the vertical leg end 37 is engaged within recess 44.

Also, the lugs 48 of bore 32 and the lugs 47 of neck ring 16 may be angled to provide a wedge type locking action.

In this embodiment the recess 24 is concave in both the vertical and horizontal planes for a greater resistance to columnar stresses and for a larger bottle capacity. In other words, the back wall 24 has a concave shape over much of its length (the normally vertical direction of the bottle 10; see FIG. 12A) and a concave shape in cross section (the normally horizontal direction across the bottle 10; see FIG. 12C). To distribute the stresses over a broader area, the ends 21 of the concave cross sectional shape are rounded to form reverse curvilinear segments which extend tangentially into the shoulder 20 and sidewall 22 of bottle 10.

In the embodiments just described and illustrated (FIGS. 8A-8D through 12A-12C) a tension handle 12 has been used for lifting, carrying and pouring.

Figure 13A:
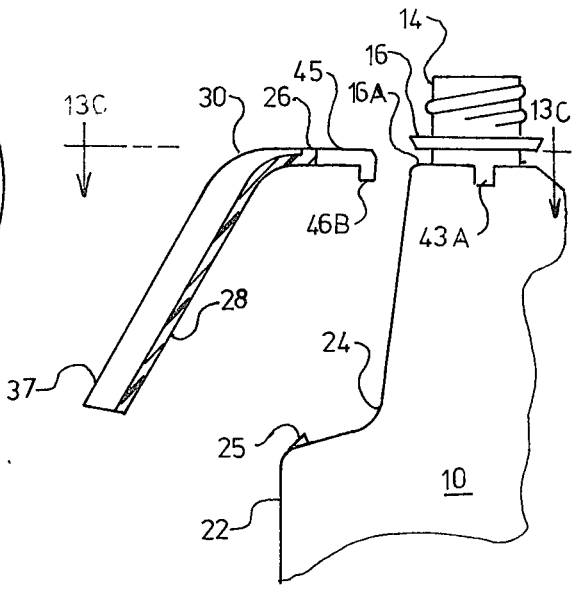
FIG. 13A is a side elevational view, partly in section, of a bottle and attachable compression handle of the invention.
Figure 13B:
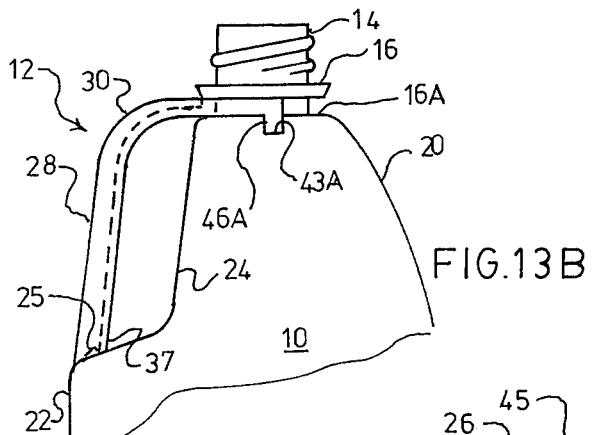
FIG. 13B is a side elevational view of the bottle and handle of FIG. 13A with the handle under compression and attached to the bottle.
Figure 13C:
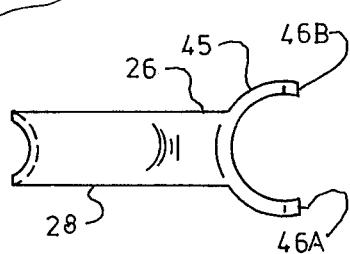
FIG. 13C is a plan view, partly in section, taken along the lines 13C—13C of FIG. 13A with a further separation of the handle and bottle.
Figure 14A:
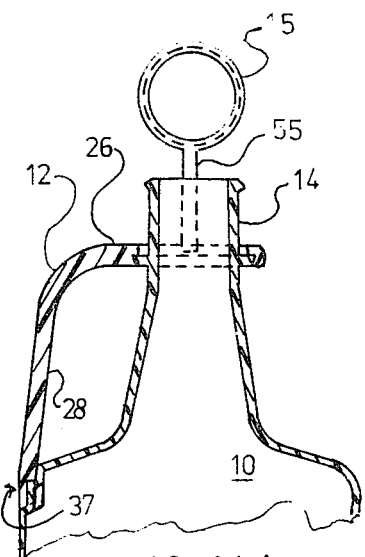
FIG. 14A is a side elevational view, in section, of another embodiment of the bottle and the attached handle with a different attachment means and with a captive closure.
Figure 14B:
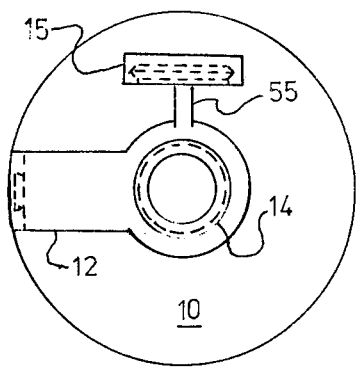
FIG. 14B is a plan view of FIG. 14A.
Figures 14C, 14D:
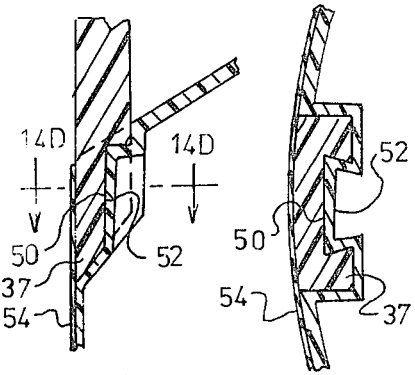
FIG. 14C is an enlarged detailed sectional view of the attaching means between the vertical leg of the handle shown in FIG. 14A and the bottle.
FIG. 14D is a plan sectional view taken along the lines 14D—14D of FIG. 14C.

Now, in FIGS. 13A-13C there is illustrated a compression handle 12 for the same purpose. As shown in FIG. 13A the compression handle 12 includes a leg 28 which, in the unassembled condition, forms an obtuse angle with the horizontal leg 26.

In assembling the compression handle 12, the downward projections 46a and 46b on the arms 45 are snapped onto locking engagement in the downward depressions 43a and 43b of shoulder 16a immediately below the ring 16, and the outwardly generally vertical depending leg 28 is moved inwardly toward the bottle 10 placing the handle 12 under compression. Continued inward movement will cause the leg end 37 to be moved over and snapped onto the projection 25.

When dimensional tolerances and part rigidities of the horizontal handle and engagement is suitable, as shown in many of the embodiments of this invention, little or no compressive force is needed to maintain the engagement of leg end 37 with projection 25, or the compression force may be imposed mostly in vertical leg 28 and less in curved segment 30.

The compression handle 12 now is ready for gripping and for lifting, carrying and pouring from the bottle 10.

With respect to the next three embodiments of the invention (FIGS. 14A-14D, 15A-15C and 16A-16C), they illustrate additional interlocking means between the vertical leg 28 of the handle 12 and the shoulder or sidewall of the bottle 10.

In FIGS. 14A-14D, there is illustrated a bottle 10 for fruit juices which includes a notch and wedge interlocking means between the sidewall of the bottle 10 and the lower end 37 of the leg 28. In this instance, the lower end 37 has an undercut notch 50 while the side wall of the bottle provides a wedge 52 which fits snugly in the notch 50 to lock the leg 28 to the bottle (see FIG. 14D).

In this embodiment, moreover, a band or label 54 wrapped about the bottle 10 and over the leg 28 assists in locking the leg 28 to the bottle 10. (See FIG. 14D which for illustrative purposes includes a portion of the label or band.)

If desired the leg 28 can be attached to the bottle 10 by a band or label 54 alone which may contain plastic materials and which provide a structural member banded over both the leg 28 and bottle 10 and bonded to the bottle 10. Also the band 54 can be formed from specialty adhesive tapes and can be of finite length and breadth sufficient to provide attachment without circumventing the bottle 10.

In addition, the handle 12 of this embodiment, as can the other embodiments of the invention, includes a captive closure or cap 15 attached to the free end of the leg 26 by an integral plastic hinge 55. The hinge 55 allows the bottle to be opened without being concerned about misplacing the cap 15. To close the bottle 10, the hinge 55 is flexed simply by gripping and placing the cap 15 on the neck finish 14.

Figure 15A:
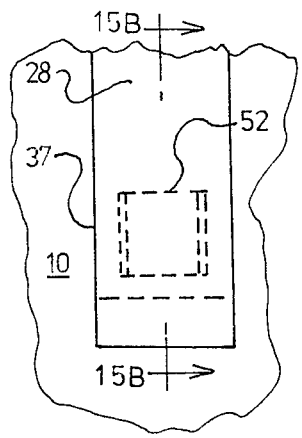
FIG. 15A is an end elevational view of another embodiment of the attaching means of the invention between the vertical leg of the handle and the bottle.
Figures 15B, 15C:
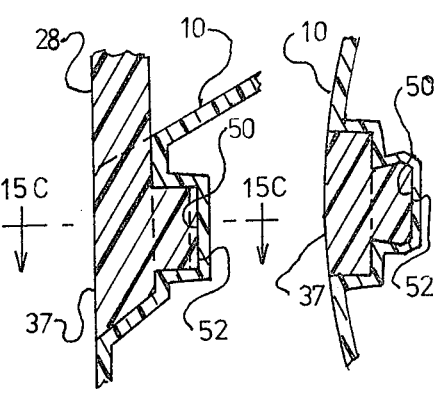
FIG. 15B is a longitudinal sectional view, taken along the lines 15B—15B, of FIG. 15A.
FIG. 15C is a plan sectional view, taken along the lines 15C—15C, of FIG. 15B.

In FIGS. 15A-15C there is illustrated another interlocking means for the leg 28 of the handle 12 and the sidewall of the bottle 10. Here, in contradistinction to interlocking means of FIGS. 14A-14D, the leg 28 is provided with the male rather than the female member of the notch and wedge. The male wedge 52 is included on the lower end 37 of the handle leg 28 while the female notch or recess 50 is formed during blow molding in the sidewall of the bottle 10 (see FIGS. 15A-15C).

Figures 16A, 16B:
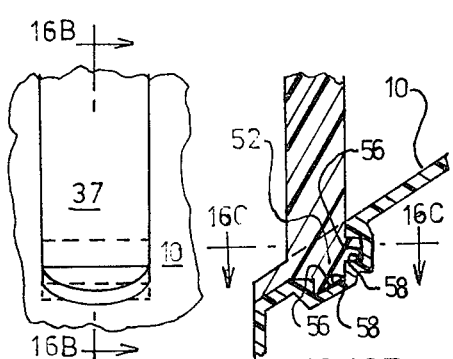
FIG. 16A is an end elevational view of another interlocking means of the invention between the vertical leg of the handle and the bottle.
FIG. 16B is a sectional view, taken along the lines 16B—16B, of FIG. 16A.
Figure 16C:
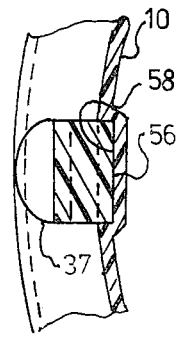
FIG. 16C is a sectional view, taken along the lines 16C—16C, of FIG. 16B.
Figure 17:
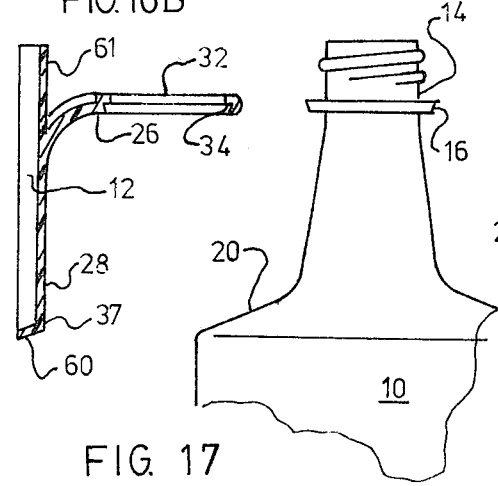
FIG. 17 is a side elevational view, partly in section, of an embodiment of the invention illustrating a bottle and an attachable handle, wherein the handle is bonded to the bottle.
Figures 18, 19:
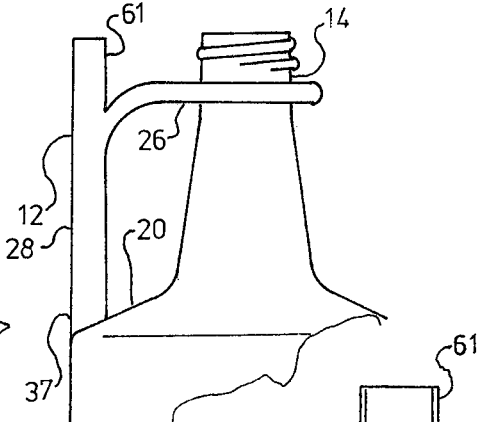
FIG. 18 is a side elevational view showing the bottle of FIG. 17 with the handle bonded thereto.
FIG. 19 is an end view of the handle shown in FIG. 17.
Figure 20:
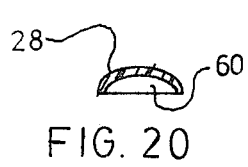
FIG. 20 is a sectional view of the vertical leg of the handle, taken along the lines 20—20, of FIG. 19.

In the embodiment of the invention shown in FIGS. 16A-16C, another wedge and notch interlocking arrangement is illustrated. Here the wedge 52 is again on the lower end 37 of handle leg 28 and includes two projections 56 which are received by correspondingly shaped notches or recesses 58 in the sidewall of the bottle 10.

In each of these embodiments the interlocking means does not adversely affect the desirable properties of the bottle 10. For example, in each embodiment the locking means on the leg 28, and for that matter the locking means on the leg 26, do not penetrate the surface of the bottle 10 or alter the condition of the plastic. In biaxially oriented bottles particularly this could be disastrous. Penetration could adversely affect the strength or impermeability provided by biaxial orientation as well as bottle shape rendering the bottle 10 useless.

Turning now to the other embodiments of the invention illustrated in the drawings (FIGS. 17-20 and 21A-21C), there are shown handles 12 attached to bottles 10 by bonding techniques.

In FIGS. 17-20 there is shown a blow-molded bottle 10 with a continuous shoulder 20 and a handle 12 with its legs 26 and 28 bonded to neck 14 and shoulder 20, respectively.

As illustrated the free end of the horizontal leg 26 includes a bore 32 which is larger in cross section than ring 16. Within the bore 32 in an annular shoulder 34 which fits easily over and abuts ring 16 to which it is then bonded. The free or lower end 37 of the vertical leg 28 has a relatively thin member 60 positioned at an angle which is complementary to the angle of the shoulder 20. When the horizontal leg 26 is properly positioned the member 60 is in contact with the shoulder 20 ready for bonding thereto. An upper extension 61 to the vertical leg provides a greater gripping surface while permitting a higher attachment site 60 for the vertical leg 28 thereby allowing the shoulder 20 to be raised.

Bonding procedures, including simple heat, ultrasonic vibration, or high frequency electric or magnetic fields, are then used to produce heat in bore 32 and member 60 or at their interfaces with the neck ring 16 and the shoulder 20, respectively, to bond the legs 26 and 28 thereto.

Alternatively, suitable bonding or adhesive agents can be applied between the bore 32 and member 60 and the neck ring 16 and shoulder 20, and where necessary, such agents can be activated by suitable energy sources.

Also, the horizontal leg 26 can be secured to the neck ring 16 at bore 32 by spin welding.

In FIGS. 21A-21C the vertical leg 28 is bonded to the bottle 10 via a thin integral wafer 62 which extends from the leg 28 in the form of a foot 60 at an angle that is complimentary to the angle of the shoulder 20. The wafer 62 because it is thin will begin to melt and adhere very quickly without impairing the shape or properties of the bottle 10. Also, bonding or adhesive agents already described can be used to attach the wafer 62 to the bottle 10.

As in the other illustrative embodiments of the invention, the bonding means selected provides the requisite bonding without impairing the properties or shape of the bottle 10. For example, where a bottle 10 is formed from a biaxially oriented thermoplastic material bonding means (e.g., uncontrolled heat or solvent action) which release the necessary molecular strain for biaxial orientation are not used.

In FIGS. 22A-22C there is shown an integral tension handle 12 and closure 15 with threaded interior portions, joined by an easily ruptured interconnecting web 64 and a blow molded bottle 10 with two adjacent threaded portions 66 and 68 designed to provide separate engagement for the closure 15 and the handle 12.

The handle-closure (12,15) is placed upon the neck finish 14 of the bottle 10 and rotated to provide engagement. When the closure portion 15 is fully engaged, the threaded handle portion 32 is not, so that further rotation will rupture the web 64 therebetween and the handle 12 will continue to turn until its horizontal leg 26 is engaged against the shoulder 70 and the vertical leg 28 is engaged within the sidewall recess 44, to thereby position the handle 12 and prevent backoff of the threaded portions 32 and 68.

With respect to the bottles and attachable handles of the present invention, they can be used to contain and pour a wide variety of pourable products. These include:

beverages, such as carbonated drinks, fruit juices and drinks, liquor, beer, wine and milk;
  foods, such as edible oils, pourable dressings, vinegar and syrups;
  medicinal and health products, such as oral antiseptics;
  toiletries and cosmetics, such as shampoo and hair care products;
  household chemicals, such as general purpose and dishwashing detergents and bleaches; and
  auto and marine products, such as motor oil and antifreeze.

With respect to producing the bottles 10 of the invention, they can be formed by any of several molding techniques, including extrusion blow-molding and injection blow molding. However, stretch blow-molding is preferred because of the desirable properties of biaxially oriented plastic bottles formed by this technique.

In the stretch blow-molding process biaxial orientation of the polymeric materials only can occur over a range of temperature within which some part of the stress applied during blowing produces strain in the polymer. It has been indicated that this requirement is met in many polymer materials if blowing is carried out within a finite temperature range above $T_g$. For these purposes, $T_g$ is assigned its conventional meaning of the temperature representing the transition from the glass phase to the rubber phase produced upon heating of the polymer. An acceptable range for biorientation—i.e., for stretch blow molding in the usual case, does not exceed 100° F. above $T_g$ for amorphous polymers. Crystalline polymers, such as polyprophylene, are processed at temperatures slightly below their crystalling melting point, $T_c$. To a significant extent, the degree of biorientation and, in consequence, the improvement in physical properties attendant upon this parameter increases for a given degree of expansion as temperature is decreased. A significant improvement in properties is generally found to result in those procedures in which the average wall thickness is reduced by a factor of at least two, while the plastic is at a temperature within 100° F. or preferably 50° F. above $T_g$. This is considered to be preferred from the standpoint of stretch blow molding, per se, and in similar fashion is considered to define a preferred embodiment in accordance with the invention.

With respect to producing the attachable handle 12 of the invention, they also can be formed by known techniques including injection, compression or transfer molding. In the preferred embodiment, however, the handle 12 is formed by injection molding.

As has been described, the handles 12 can be attached to the bottles 10 by snap or interlocking means, or by bonding, welding, adhesive or still other means.

In FIGS. 1-7, 8A-8D, 9A-9C, 10A-10C, 11A-11C, 12A-12C, 13A-13D, 14A-14D, 15A-15C and 16A-16C various snap fit and interlocking means have been illustrated.

Alternatively, the handles 12 can be attached to the bottles 10 by a variety of bonding techniques. (See FIGS. 17-20 and 21A-21C.) These bonding techniques include welding operations generally accomplished by frictional heating, or by procedure in which contacting surfaces are placed in relative movement. Vibration may be at sufficiently high frequency and producing sufficient frictional heat to result in ultrasonic welding. A variety of alternative heating means may utilize external fields: magnetic, electric, or electromagnetic. As ordinarily practiced, electromagnetic welding, induction welding, as well as radiation welding may make use of intrinsic properties of the plastic material or may depend upon fillers which are designed to convert field energy to thermal energy. Such fillers may take the form of magnetically or electrically polar particles or may have larger absorption cross-section for radiation.

An expeditious form of bonding may involve chemical modification of the plastic, for example, by cross-linking. This cross-linking or curing which may be induced by radiation of suitable quantum energy may result from polymer cross-linking, for example, by inclusion of a difunctional curing medium—or for that matter, by any medium of greater polyfunctionality.

Local conductive heating is generally not preferred, particularly as practiced in stretch blow molding, since excessive heat conducted through the stretched sidewall results in degradation of those properties dependent upon biaxial orientation and release of orientation stress may result in collapse of the sidewall, possibly with its rupture. However, the handle extremity shown in FIGS. 21A through 21C represents a valuable embodiment in accordance with the invention which enables the use of local conductive heating. In this case, the handle extremity possesses a very thin section abutting the sidewall of the bottle. This section can be heated sufficiently to fuse itself to the sidewall without generating sufficient heat content to substantially effect a deterioration of the thicker sidewall of the bottle.

In some instances, bonding of the handles 12 to the bottles 10 can be achieved through the use of adhesives of a hot melt type or such as can be achieved with water-based, solvent-based or other adhesives which cure at ambient conditions.

With respect to materials for forming the bottles, these include those satisfactory for blow-molding or those satisfactory for the preferred embodiments of stretch blow molding. Both contemplate polymeric materials which at least during the blowing operation are thermoplastic. Compositionally, polymer (or plastic) material satisfactory for use are hydrocarbons or substituted hydrocarbons. Materials include the simple unsubstituted homopolymers, polypropylene and polystyrene, substituted polymers, such as, acrylonitriles, and polyesters, such as polyethylene terephthalate.

With respect to materials for forming the handles, these include the same materials used for forming the bottles. Inasmuch as the handles are formed separately these materials can be dissimilar to those of the bottles and can be specifically selected to maximize the properties of the handles, such as resiliency, toughness and stiffness. For example, impact polystyrene handles would provide suitably high levels of toughness, stiffness, close dimensional tolerances for optimum performance during attachment to and use with a variety of bottles made from polyethylene, polypropylene, polyethyleneterephthalate, etc.

In addition, where desired these handles can be of a different color than the bottle. Also the handle can be formed from scrap or other materials which may not be suited for contact with the contents to be contained.

Furthermore, it is within the scope of this invention to select and combine features of various embodiments. With respect to the illustrative embodiments, for example:

the threaded upper arm engagement (32 and 68) of FIGS. 22A-22C may be combined with the lower arm compression and engagement (25 and 37) of FIGS. 13A-13C and the alignment means 18, 36 of FIGS. 1-7;

the snap fit engagement (16 and 34) may be combined with the integral closure 15 and interconnecting web 64 of FIGS. 22A-22C;

the interlocking by engagement means (47,48) of FIGS. 12A-12C may be combined with the interlocking lower handle end engagement of FIGS. 1-7 (25,37); or the neck-yoke arm engagement of the upper handle arm (43a-c and 46a-c) of FIGS. 8A-8D may be combined with the bonding engagement (60,62) of the lower handle arm of FIGS. 21A-21C.

Moreover, while in the preferred embodiment the handle 12 is generally L-shaped, it is within the scope of this invention to have a handle 12 before attachment of another shape, e.g., straight, which can be bent or formed to the generally desired L-shape during attachment. Also the vertical leg 28 can include a lateral extension which is secured to the interlocking means on the sidewall of the bottle 10. In this instance the interlocking means, e.g., projection 25, can be located well within the recess 23.

With respect to terms herein, they have been used in their conventional sense. For example, as described above, particularly useful embodiments depend upon extrusion or injection molding to produce a preform and stretch blow molding to produce the final bottle. These and other terms used in the description are briefly defined:

Plastic: a category of organic materials, generally thermoplastic, substituted or unsubstituted, hydrocarbons—examples are polyolefins, such as polypropylene, and polyesters, such as polyethylene terepthalate.

$T_g$: (glass transition) temperature at which the plastic changes from a glassy state to a rubbery state. Molding operations are invariably carried out substantially above $T_g$—generally at temperatures at least 100° F. in excess. Preferred embodiments herein which depend upon biaxial orientation are carried out with the plastic in the rubbery state but over a lower range, generally within 100° F. of $T_g$.

Molding: that category of procedures in which plastic material is caused to flow into the interstices of the mold to result in a formed object which becomes rigid upon cooling.

Preform: (occasionally referred to as parison) the molded form which, in the procedures of the invention, is formed preliminary to expansion to produce the final object and, therefore, a form somewhat smaller than that of the final object. As generally contemplated, the preform is produced with the plastic at an elevated temperature in excess of 100° F. above $T_g$.

Extrusion molding: that molding procedure generally utilized to produce the preform or parison. In the usual commercial process, plastic materials introduced as particulate matter by a screw or ram with or without external heating is brought to elevated temperature so that it is introduced as a flowing plastic under pressure through a die to produce the preform.

Injection molding: that molding procedure generally utilized to produce the preform. In the usual commercial process, plastic materials introduced as particulate matter by a screw or ram with or without external heating is brought to elevated temperature so that it is introduced as a flowing plastic under pressure into a mold to produce the preform. Connecting passages known as runners are common.

Compression or Transfer molding: One of the more common alternatives to injection molding to produce the handle in which a mass of plastic is heated and is introduced into a mold portion. Whereafter, an additional mold portion, such as a plunger, distorts the mass to cause it to conform, again, with the interstices of the now completed mold.

Blow molding: This term contemplates expansion of the preform to its final configuration by the use of gas under pressure. This requires use of a blow mold. As practiced in the past, no effort was made to change the temperature of the preformed plastic before or during the blowing operation. Some reduction in temperature naturally results from contact with the preform mold.

Stretch blow molding: Blow molding in which the preform is stretched often by means of an inserted plunger prior to blowing. The procedure is recognized as advantageously practiced with the plastic material within a temperature range close to but above $T_g$ so as to result in extension of the polymer molecules from their natural state to an extended state with the major molecular axis as resolved lying in the direction of stretch. Blowing is carried out within the same temperature range designed to result in retained orientation and produces orientation in the blow direction so that the resulting final configuration is "biaxially oriented".

The invention in its broader aspect is not limited to the specific described embodiments and departures may be made therefrom within the scope of the accompanying claims without departing from the principals of the invention and without sacrificing its chief advantages.

What is claimed is:

1. A bottle having a neck portion, a sidewall and a lifting, carrying and pouring handle attached thereto, wherein said handle generally is L-shaped and is positioned substantially within the breadth of the bottle, and includes a generally horizontal leg attached to said neck portion, and a generally vertical leg in engagement with the sidewall of the bottle which has been flexed outwardly to place said handle under tension and to maintain said generally vertical leg in engagement with the sidewall of the bottle during lifting, carrying and pouring.

2. The bottle of claim 1, wherein the sidewall of the bottle has a depression therein spaced below the neck portion thereof where said horizontal leg of said handle is attached thereto, and wherein the free end of said vertical leg is inserted and maintained.

3. The bottle of claim 1, wherein the neck portion of the bottle has a plurality of depressions therein, and the free end of said horizontal leg of said handle includes projections which are inserted into said neck depressions to lock said handle thereto.

4. The bottle of claim 1, wherein the neck portion of the bottle and the free end of said horizontal leg of said handle include projections thereon which engage one another to lock said handle thereto.

5. A bottle and a handle for gripping, carrying and pouring which is attached thereto, wherein the bottle includes a relatively narrow neck portion having integral means thereon which restricts movement of the attached handle about the perimeter of the bottle, and a sidewall extending from said neck portion having integral attachment means thereon, and wherein the handle is a separate one-piece plastic molded member which is positioned substantially within the breadth of the bottle, and includes a substantially horizontal portion having a free end which at least partially encircles and coacts with integral means on said neck portion to affix said horizontal portion thereto and to restrict movement thereof about the perimeter of the bottle, and a substantially vertical portion that has attachment means thereon which coact with said integral attachment means on said sidewall of the bottle for affixing said portion thereto.

6. The bottle and handle of claim 5, wherein said bottle and said handle have means thereon for properly aligning said handle on said bottle.

7. The bottle and handle of claim 6, wherein said positioning means includes a notch in said neck portion in alignment with said attachment means on said sidewall of the bottle, and a projection on said free end of said substantially horizontal portion adapted to engage said notch for aligning said handle on the bottle immediately prior to attachment thereto.

8. A bottle and a handle for gripping, carrying and pouring which is attached thereto, wherein the bottle includes a relatively narrow neck portion and a sidewall extending from said neck portion having integral attachment means thereon which restricts movement of the attached handle about the perimeter of the bottle, and wherein the handle is a separate one-piece plastic molded member which is positioned substantially within the breadth of the bottle, and includes a substantially horizontal portion having a free end which at least partially encircles and coacts with said neck portion to affix said horizontal portion thereto, and a substantially vertical portion that has attachment means thereon which coact with said integral attachment means on said sidewall of the bottle for affixing said portion thereto and for restricting its movement about the perimeter of the bottle.

9. The bottle and handle of claim 5 or 8, wherein said attachment means on said substantially vertical portion of said handle and on said sidewall of the bottle are interlocking means.

10. The bottle and handle of claim 5 or 8, wherein the free end of said substantially horizontal portion of said handle includes a captive bottle closure attached thereto by a plastic hinge which permits closing and opening of the bottle while said closure is attached to said leg.

11. The bottle and handle of claim 5 or 8, wherein said neck portion has a neck ring, and said substantially horizontal portion of said handle has a bore therethrough at its free end in which there is an annular shoulder adapted to be snap fitted onto said neck ring to lock said horizontal leg thereto.

12. The bottle and handle of claim 5 or 8, wherein said attachment means on said bottle sidewall is a projection adapted to be in engagement with said substantially vertical portion of said handle to affix said handle thereto.

13. The bottle and handle of claim 5 or 8, wherein said attachment means on said bottle sidewall is a lug, and wherein said substantially vertical portion of said handle has projections which engage sides of said lug to lock said handle thereto.

14. The bottle and handle of claim 5 or 8, wherein said substantially vertical portion of said handle includes a wafer thin member extending therefrom adapted to be bonded to said attachment means on said sidewall of the bottle to affix said handle thereto.

15. The bottle and handle of claims 5 or 8, wherein said handle is formed from the same thermoplastic material as said bottle.

16. The bottle and handle of claims 5 or 8, wherein said handle is made from a material which is dissimilar from the thermoplastic material of said bottle.

17. The bottle and handle of claim 5 or 8, wherein said attachment means on said substantially vertical portion of said handle and on said sidewall of the bottle are snap fitting means.

18. The bottle and handle of claim 5 or 8, wherein said attachment means on said substantially vertical portion of said handle and on said sidewall of the bottle are bonding means.

19. The bottle and handle of claim 5 or 8, wherein said attachment means on said substantially vertical portion of said handle and on said sidewall of the bottle are welding means.

20. The bottle and handle of claim 5 or 8, wherein said attachment means on said substantially vertical portion of said handle and on said sidewall of the bottle are adhesive means.

21. The bottle and handle of claims 5 or 8, wherein the free end of said horizontal portion of the handle includes a plastic bottle closure temporarily connected thereto, and wherein said closure is secured on said neck portion prior to affixing said horizontal portion of the handle thereto, to thereby break the temporary connection therebetween.

22. A bottle and a handle for gripping, carrying and pouring which is attached thereto, wherein the bottle is formed from a thermoplastic material and includes a relatively narrow neck portion having integral means thereon which restricts movement of the attached handle about the perimeter of the bottle, and a sidewall extending from said neck portion having integral attachment means thereon, and wherein the handle is a separate one-piece plastic molded member which is positioned substantially within the breadth of the bottle, and includes a substantially horizontal portion having a free end which at least partially encircles and coacts with integral means on said neck portion to affix said horizontal portion thereto and to restrict movement thereof about the perimeter of the bottle, and a substantially vertical portion that has attachment means thereon which coact with said integral attachment means on said sidewall of the bottle for affixing said portion thereto.

23. The bottle and handle of claims 5 or 22, wherein said substantially vertical portion of said handle is flexed inwardly toward the bottle to place said handle under compression when said attachment means thereon coact with said integral attachment means on said sidewall of the bottle to affix said bottle thereto.

24. A bottle and a handle for gripping, carrying and pouring which is attached thereto, wherein the bottle is formed from a thermoplastic material and includes a relatively narrow neck portion and a sidewall extending from said neck portion having integral attachment means thereon which restricts movement of the attached handle about the perimeter of the bottle, and wherein the handle is a separate one-piece plastic molded member which is positioned substantially within the breadth of the bottle, and includes a substantially horizontal portion having a free end which at least partially encircles and coacts with said neck portion to affix said horizontal portion thereto, and a substantially vertical portion that has attachment means thereon which coact with said integral attachment means on said sidewall of the bottle for affixing said portion thereto and for restricting its movement about the perimeter of the bottle.

25. The bottle and handle of claim 22 or 24, wherein said handle includes flexing means therein which allow flexing thereof for attachment to the bottle and to accommodate dimensional changes when the portion of the bottle adjacent the bottle handle is under internal pressure.

26. The bottle and handle of claims 22 or 24, wherein said bottle is formed from a biaxially oriented thermoplastic polymeric material for containing carbonated beverages.

27. The bottle and handle of claims 22 or 24, wherein said bottle is formed from a biaxially oriented thermoplastic material selected from the group consisting of polypropylene, polystyrene, polyethylene terephthalate and acrylonitrile.

28. The bottle and handle of claims 22 or 24, wherein said bottle is formed from biaxially oriented polypropylene and is used for containing carbonated beverages.

29. A plastic bottle having a relatively narrow neck portion, and a sidewall extending from said neck portion; and a handle which generally is L-shaped and is positioned substantially within the breadth of the bottle and which includes a substantially horizontal leg having a free end that coacts with said neck portion to affix said horizontal leg thereto, and a substantially vertical leg having a free lower end, wherein said lower free end and said sidewall include engaging wedge and recess means adapted to coact to affix said vertical leg to said sidewall, and wherein said handle is affixed to the bottle for lifting, carrying and pouring therefrom.

30. A plastic bottle having a relatively narrow neck portion, a sidewall extending from said neck portion, and opposing engageable depressions in said sidewall; and a handle which generally is L-shaped and is positioned substantially within the breadth of the bottle and which includes a substantially horizontal leg having yoke-shaped resilient arms with inwardly extending projections which engage said depressions to lock said leg thereto, and a substantially vertical leg having a free lower end, wherein said lower free end and said sidewall having engaging locking means to affix said vertical leg to said sidewall, and wherein said handle is attached to the bottle for lifting, carrying and pouring therefrom.

31. In a process for assembling a bottle and a handle attached thereto for lifting, carrying and pouring wherein the handle generally is L-shaped and is positioned substantially within the breadth of the bottle with one leg coacting with and affixed to the neck of the bottle and with the other leg maintained in engagement with the sidewall of the bottle, and wherein the bottle and handle have means thereon for properly aligning the handle on the bottle, the steps comprising bringing said bottle and handle into contact with one another and rotating one relative to the other until the aligning means are brought into engagement, whereupon said handle is attached to said bottle in proper alignment.

32. In a process for assembling a bottle and a handle attached thereto for lifting, carrying and pouring, wherein the bottle includes a neck portion and a sidewall, and wherein the handle generally is L-shaped and is positioned substantially within the breadth of the bottle, and has a generally horizontal leg attached to said neck portion, and a generally outwardly flexed vertical leg in engagement with the sidewall of the bottle which places said handle under tension, the steps comprising bringing said horizontal leg into contact with the neck portion, concurrently flexing said vertical leg outwardly and attaching said horizontal leg to the neck portion to place the handle under tension, and engaging said flexed vertical leg to the sidewall of the bottle.

* * * * *